(12) United States Patent
Hasanovic

(10) Patent No.: US 6,349,559 B1
(45) Date of Patent: Feb. 26, 2002

(54) COOLER CHEST WITH ICE-SURROUNDED FOOD COMPARTMENT

(76) Inventor: Simbad Hasanovic, 2442A - 34 Avenue SW, Calgary, Alberta (CA), T2T 5C8

( * ) Notice: Subject to any disclaimer, the term of this patent is extended or adjusted under 35 U.S.C. 154(b) by 0 days.

(21) Appl. No.: 09/714,290

(22) Filed: Nov. 17, 2000

(51) Int. Cl.[7] ................................................. F25D 3/08
(52) U.S. Cl. ........................... 62/457.7; 62/389; 62/371
(58) Field of Search ................................ 62/457.7, 389, 62/371, 457.1, 457.2, 457.5, 372, 529; 280/47.26

(56) References Cited

U.S. PATENT DOCUMENTS

| | | |
|---|---|---|
| 307,341 A | 10/1884 | Shaw |
| 1,369,367 A | 2/1921 | Thomson |
| 3,591,194 A | 7/1971 | Vega ........................ 280/47.26 |
| 4,498,312 A | 2/1985 | Schlosser ...................... 62/457 |
| 5,329,787 A | 7/1994 | Friday ........................... 62/389 |
| 5,568,735 A | 10/1996 | Newkirk et al. ........... 62/457.7 |
| 5,671,611 A | 9/1997 | Quigley ..................... 62/457.7 |
| 5,845,515 A | 12/1998 | Nelson |

Primary Examiner—Henry Bennett
Assistant Examiner—Chen-Wen Jiang
(74) Attorney, Agent, or Firm—David S. Thompson

(57) ABSTRACT

A cooler chest with an ice-surrounding food compartment (10) includes an outer container 20 that supports an outer lid (40). An inner container (60) having an inner lid (80) is carried within the outer container (20). In use, an ice storage area is defined within an area between the inner and outer containers; food is contained within the inner container. Due to the curvature of the sidewall of the outer container and due to the sloping sidewall of the inner lid carried by the inner container, a flared ice entry passage is defined which aids in the addition of ice.

4 Claims, 6 Drawing Sheets

COOLER CHEST WITH ICE-SURROUNDED FOOD COMPARTMENT

CROSS-REFERENCES

There are no applications related to this application filed in this or any foreign country.

BACKGROUND

It is commonly the case that cooler chests mix food and ice within an enclosure. This results in the temperature of the food being reduced, and promotes heat transfer from the food to the ice. A few cooler chests, such as that disclosed in U.S. Pat. No. 5,671,611, issued Sep. 30, 1997 to Gene Kirk Quigley, have disclosed a separate food compartment within the cooler chest. Similarly, another strategy is to enclose the ice in a container; some such ice containers are refreezable.

In spite of such developments, a problem still exists in adding ice to coolers having separate ice and food areas. Ice cubes tend to melt somewhat prior to being loaded into a cooler, and then tends to refreeze into larger masses. Such masses may be difficult to squeeze into an area designated for ice storage. As a result, regions within the ice storage areas may not fully filled with ice, and the cooling ability of the cooler chest is degraded.

Additionally, heat transfer from the food storage area to the ice storage area is often impeded by structures which provide unintentional insulation. Similarly, heat flow into the cold ice water formed from melting ice is often reduced due to lack of a direct thermal passage between the food storage area and the cold ice water.

And further, the food storage area may be difficult to access, due in part to interference with structures forming the ice storage area, or due to the need to move ice to access the food compartment.

What is needed is a cooler chest with an ice-surrounded food compartment that provides easy access to the ice storage ares, whereby ice may be conveniently added in a manner that allows some compound chunks of multiple ice cubes to be easily added. The cooler chest must also provide thermal conductivity between the ice storage areas and food storage areas. Similarly, there should be thermal conductivity between the melted ice water and the food storage area. The food and ice storage areas should both be easily accessed.

SUMMARY

The present invention is directed to an apparatus that satisfies the above needs. A novel cooler chest includes an outer container that encloses a food-carrying inner container. The cooler allows easy access to the ice storage areas defined between the inner and outer containers, and easy access to the food storage area. The cooler chest provides thermal conductivity between the ice storage areas and food storage areas, and between the melted ice water and the food storage area.

The cooler chest with ice-surrounded food compartment of the present invention provides some or all of the following structures.

(A) An outer container 20 includes a body having a base 27 and sidewalls formed of curved outer and inner surfaces 21, 22 between which is carried an insulation layer 26. Handle surfaces 23 are defined on the outer surface. An ice storage area 102 is defined between the curved inner surface 22 and outer sidewall surface 61 of the inner container 60. Access to the ice storage area is improved by the direction of curve of the inner surface 21, which flares outwardly form an ice entry passage 100 for the loading of ice. A perimeter rim 24 defining a notch 25 engages the outer lid 40. A recessed region 28 defined in the base supports and secures the inner container. Ice water troughs 31, optionally defined in the base, allow water produced by the melting ice to circulate in contact with the base of the inner container.

(B) The outer lid 40 defines a sloping sidewall 43 having a perimeter rim 41 and tongue 42 which engage the perimeter rim and notch of the outer container 20. A handle surface 44 is defined on the sloping sidewall, allowing convenient removal of the outer lid. The flat top 45 and sloping sidewalls 43 are filled with an insulating material 46, which reduces heat conduction into the outer container.

(C) An inner container 60 is carried entirely within the outer container 20. In use, a portion of the base 66 of the inner container is inserted into the recessed region 28 defined in the base 27 of the outer container 20. The inner container is thermally conductive between its outer and inner surfaces 61, 62, allowing heat to be transferred from items of food stored within the inner container to ice and cold water carried within the ice storage area 102 defined between the outer and inner containers 20, 60. A handle surface 63 is defined on the outer surface, and allows the inner container to be easily removed form the outer container and carried. A perimeter rim 64 defines a notch 65 that engages the inner lid.

(D) An inner lid 80 is sized to seal the inner container 60. A perimeter rim 81 and tongue 82 engage the perimeter rim 64 and notch 65 of the inner container 60. A sloping sidewall 83 defines a handle surface 84 that allows easy removal of the inner lid. A flat top portion 85 of the inner lid may optionally support four feet 86. The feet support the inner surface 47 of the outer lid, thereby reducing the area over which the outer lid must span unsupported.

It is therefore a primary advantage of the present invention to provide a novel cooler chest with ice-surrounding food compartment that separates ice and food, each with separate compartments.

Another advantage of the present invention is to provide a cooler chest with ice-surrounding food compartment wherein the outer container has a curved sidewall, particularly wherein an upper rim of the curved sidewall flairs outwardly, thereby allowing the more convenient loading of ice into an ice storage area defined between the inner and outer containers.

A still further advantage of the present invention is to provide a cooler chest with ice-surrounding food compartment, wherein the base of the outer container defines a recessed region, whereby a portion of the base of the inner container may be located within the recessed region thereby holding the inner container in place, and optionally the base of the outer container may define ice water troughs, whereby water melted from the ice may circulate in contact with the base of the inner container.

Other objectives, advantages and novel features of the invention will become apparent to those skilled in the art upon examination of the specification and the accompanying drawings.

DRAWINGS

These and other features, aspects, and advantages of the present invention will become better understood with regard to the following description, appended claims, and accompanying drawings where:

DESCRIPTION

Figure 1:
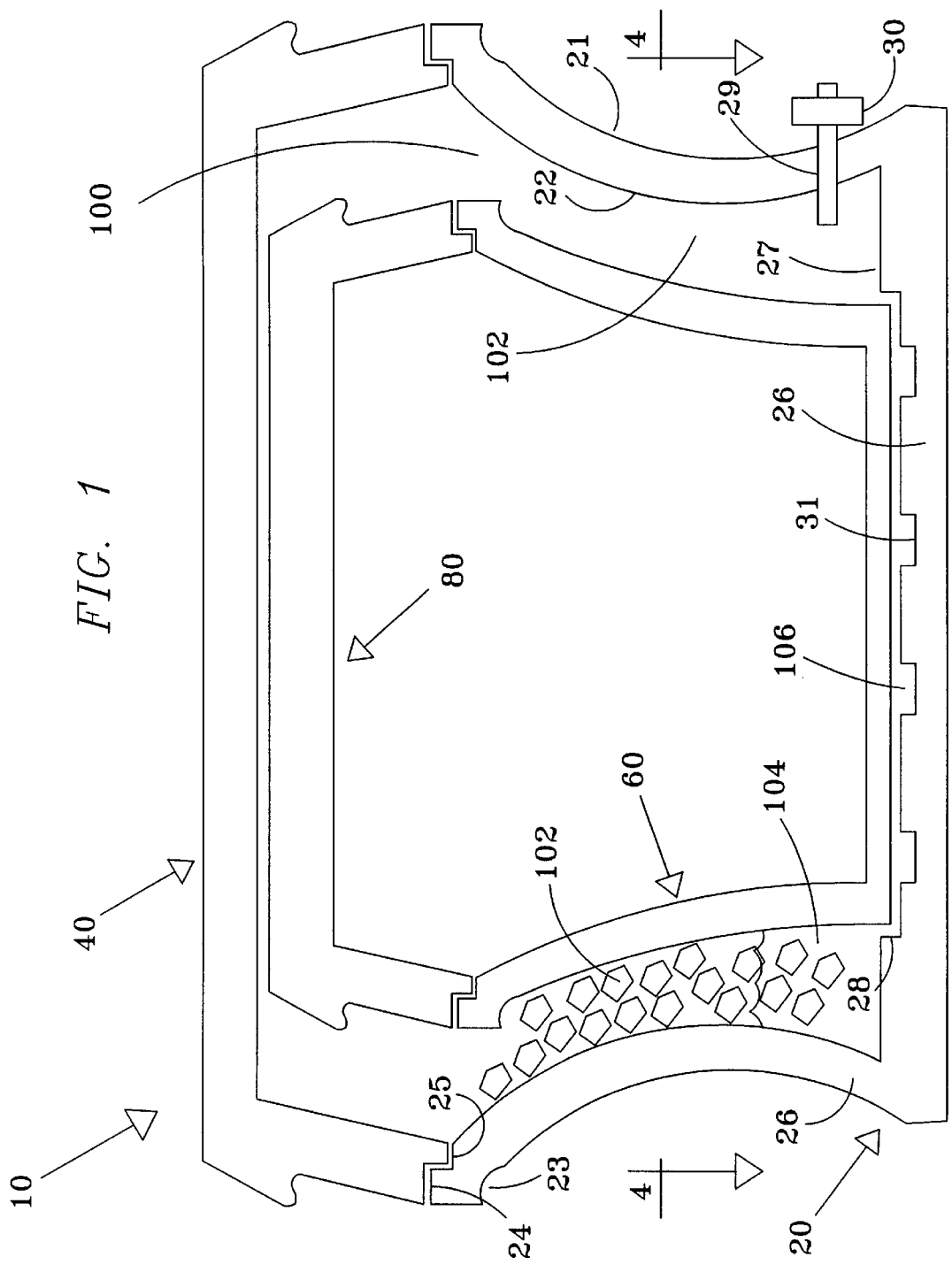
FIG. 1 is an orthographic cross-sectional view along a lengthwise plane of a version of the cooler chest with ice-surrounded food compartment.

Referring in generally to FIGS. 1 through 4, a cooler chest with ice-surrounding food compartment 10 constructed in accordance with the principles of the invention is seen. An outer container 20 supports an outer lid 40. An inner container 60 having an inner lid 80 is carried within the outer container 20. In use, an ice storage area 102 is defined within an area between the inner and outer containers; food is contained within the inner container. Due to the curvature of the sidewall of the outer container and due to the sloping sidewall of the inner lid carried by the inner container, a flared ice entry passage 100 is defined which aids in the addition of ice.

Figure 2:
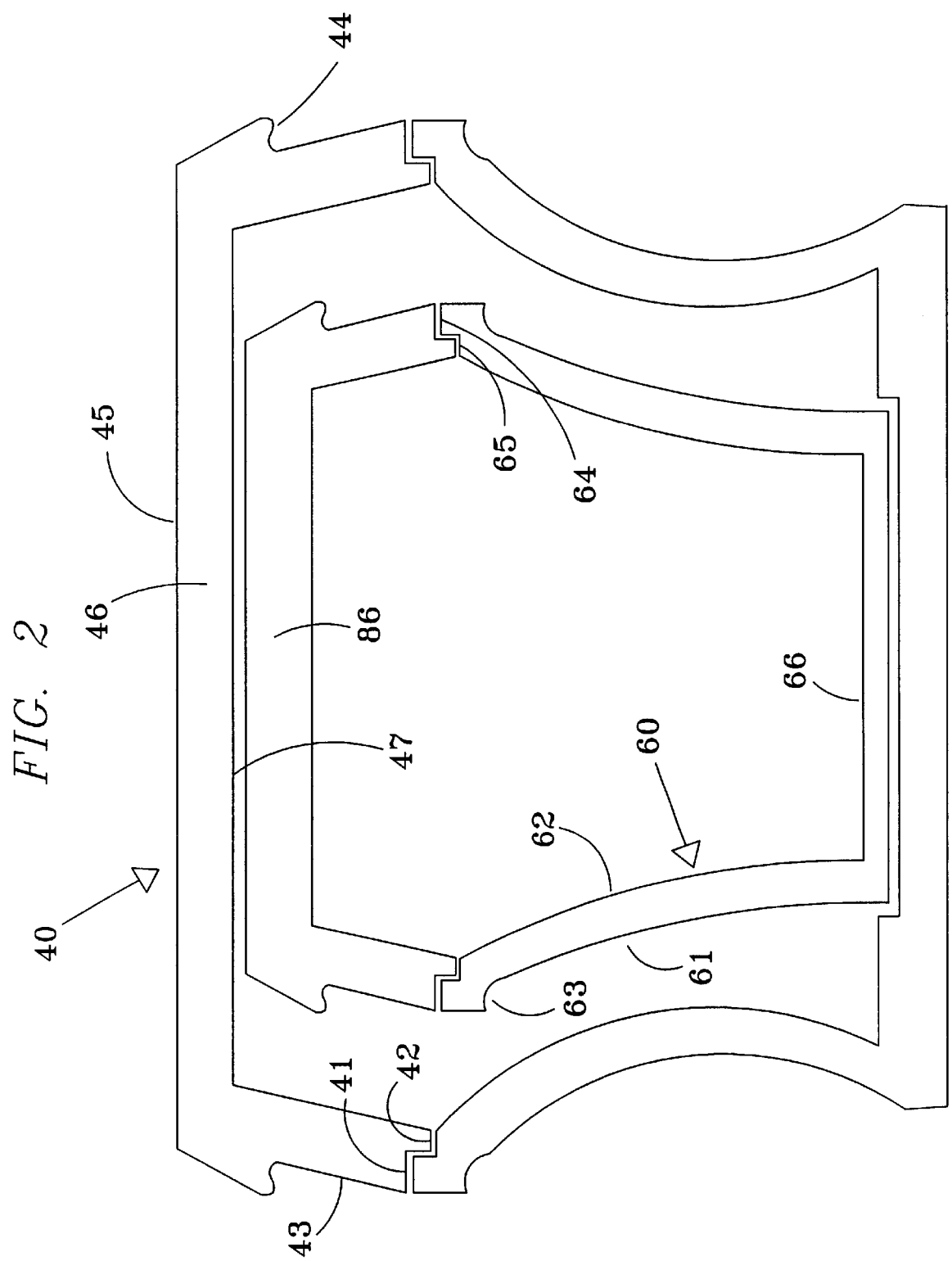
FIG. 2 is an orthographic cross-section taken from an end-view perspective at 90 degrees to that of FIG. 1.
Figure 3:
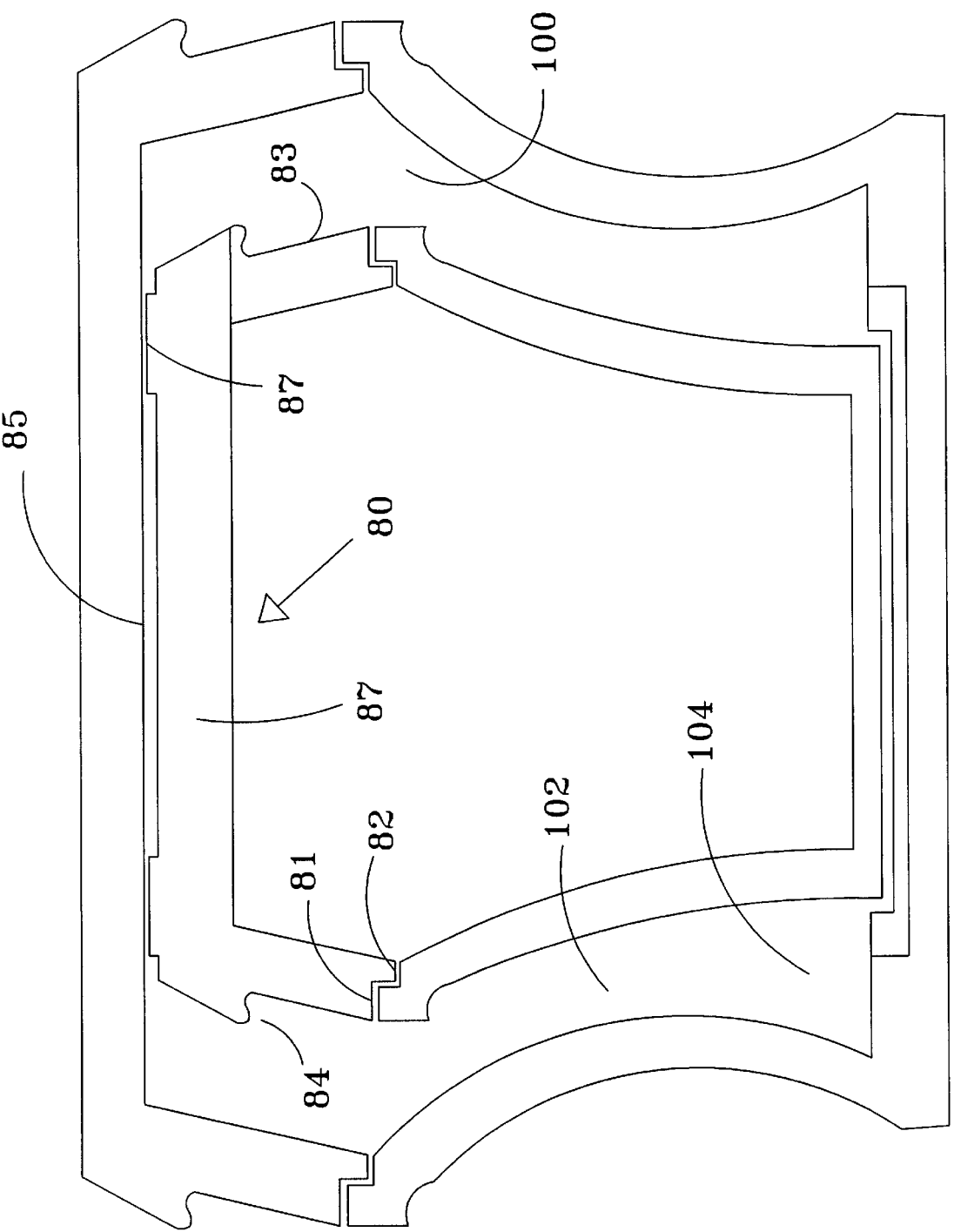
FIG. 3 is a view similar to that of FIG. 2, illustrating the optional ice water troughs that are oriented perpendicular to the length of the cooler chest, and illustrating the optional support feet defined on the top of the inner lid of the inner container.

Referring particularly to FIGS. 1–3, it can be seen that an outer container 20 includes a body having a base 27 and curved sidewalls. The outer container is fitted with an outer lid 40, and is sized to contain the inner container 60 and its lid 80. An ice entry passage 100 is defined between the curved inner sidewall surface 22 of the curved sidewalls and the inner container and inner lid. An ice storage area 102 is defined between the inner and outer containers. An outwardly flared portion of the curved inner sidewall surface defines an ice water area 104, within which a mixture of ice and water is stored.

The curved sidewalls are formed between curved outer and inner surfaces 21, 22. An upper perimeter rim 24 of the curved sidewalls defines a notch 25. The rim 24 and notch 25 are sized to mate with the perimeter rim 41 and tongue 42 of the outer lid.

A drain pipe 29 and drain valve 30 are carried by a lower portion of an end panel of the sidewall, as seen in FIG. 1. The drain allows water to be removed from within the outer container, and the valve allows control over this process.

As seen in FIGS. 1–3, handle surfaces 23 are defined on an upper portion of the lengthwise and end sides of the outer surface. The handle surfaces are substantially horizontally oriented, and are at approximately 90 degrees to an upper portion of the flared sidewalls.

The outer container is thermally insulated to slow the transfer of heat from the outside to the inside of the container. The sidewalls and base include an insulation layer 26, which may be made of any material having low thermal conductivity, and particularly any conventional insulator.

A base 27 supports the lower edge of the front, back and end sidewall elements. A recessed region 28 is defined on an upper surface of the base. The size of the recessed region is incrementally greater than the base 66 of the inner container. As a result, when the inner container is inserted into the recessed region, the inner container is supported and restrained.

Figure 4:
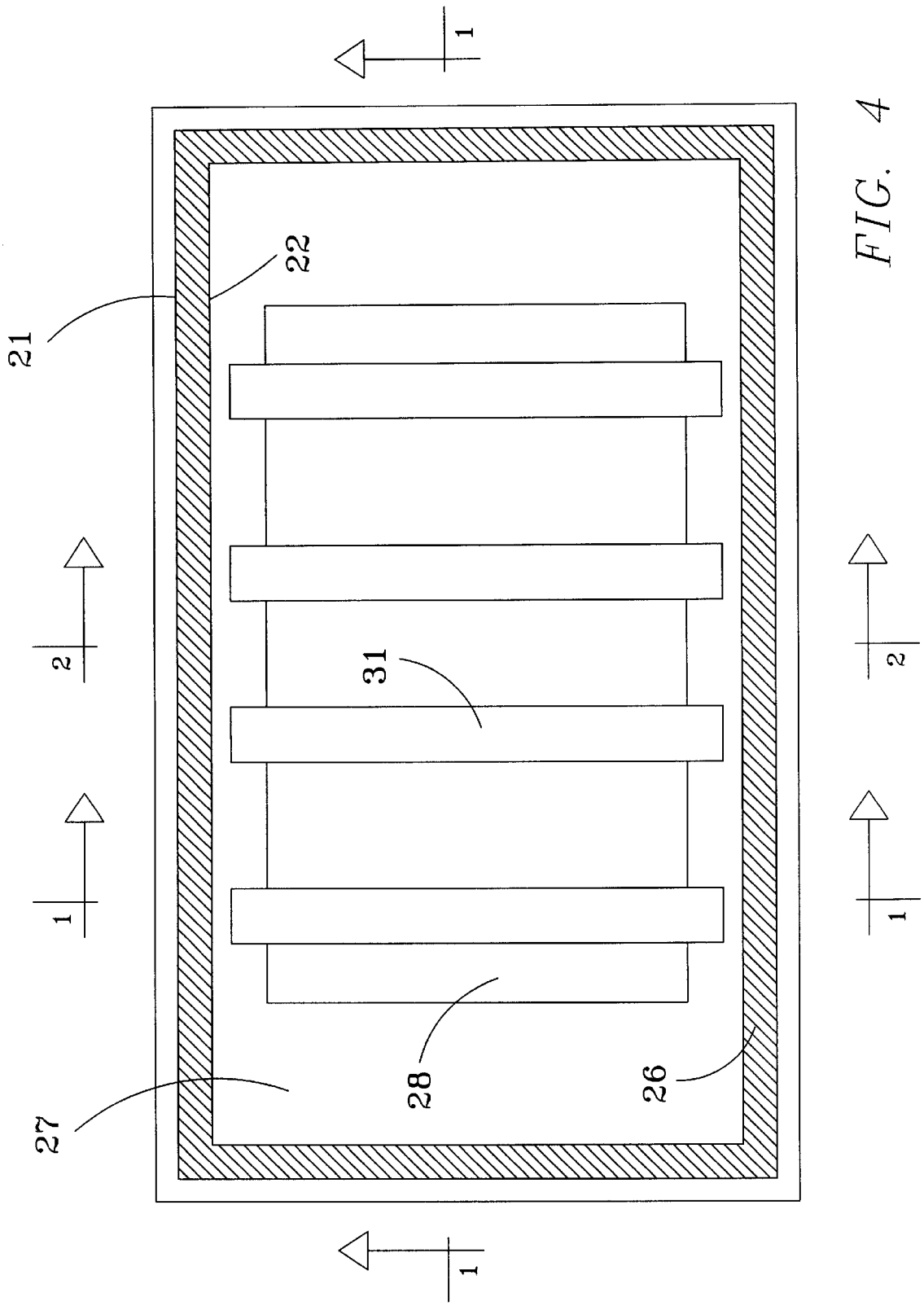
FIG. 4 is an orthographic plan view of the base of the outer container, illustrating the recessed region for support and orientation of the inner container, and illustrating four optional ice water troughs for improving heat conductivity between the melted ice water and the inner container.

As seen in FIGS. 1 and 4, ice water troughs 31 may optionally be defined in the base. The ice water troughs form ice water passages 106, which allow water produced by the melting ice to circulate in contact with the base of the inner container. This movement allows the ice water to absorb and remove heat energy from the inner container 60.

An outer lid 40 allows the outer container to be sealed in a manner that tends to slow thermal conduction between the ambient air and the interior of the outer container. As seen in FIGS. 1–3, the outer lid includes a perimeter rim 41 and tongue 42 sized to seal with the perimeter rim 24 and notch 25 of the outer container 20.

The outer lid 40 defines a sloping sidewall 43 having a perimeter rim and tongue which engage the perimeter rim and notch of the outer container 20. A handle surface 44 is defined in a sloping sidewall, allowing convenient removal of the outer lid. The flat top 45 and sidewalls are filled with an insulating material 46, which reduces heat conduction into the outer container from the ambient environment.

As seen in FIGS. 1–3, in use an inner container 60 is carried entirely within the outer container 20. During installation of the inner container, a portion of the base 66 of the inner container is inserted into the recessed region 28 defined in the base 27 of the outer container 20.

In a preferred embodiment, the inner container is thermally conductive between its outer and inner surfaces 61, 62, allowing heat to be transferred from items of food stored within the inner container to ice and cold water carried within the ice storage area 102 and ice water area 104 defined between the outer and inner containers 20, 60.

As seen in FIGS. 1–3, a handle surface 63 is defined along the lengthwise and end edges of the outer surface, and allows the inner container to be easily moved and carried. In a manner similar to the outer container, a perimeter rim 64 defines a notch 65 which engages the tongue 82 of the inner lid 80.

An inner lid 80 allows the inner container to be sealed in a manner that eliminates air flow into the inner container when the lid is sealed. This tends to preserve the food carried within the inner container. As seen in FIGS. 1–3, the inner lid includes a perimeter rim 81 and tongue 82 sized to seal with the perimeter rim 64 and notch 65 of the inner container 60.

The inner lid 80 defines a sloping sidewall 83 having a perimeter rim and tongue which engage the perimeter rim and notch of the inner container 60. A handle surface 84 is defined about a perimeter along a sloping sidewall 83, allowing convenient grasping of any side of the outer lid. The flat top 85 and sloping sidewalls 83 are optionally filled with an insulating material 86.

As seen in FIG. 2, support feet 87 may optionally be installed on an upper surface of the flat top 85. The support feet make contact with the inner surface 47 of the outer lid 40 when both lids are attached to their respective containers. As a result, weight applied to the upper surface of the outer lid is partially carried by the feet, and in turn by the inner container. As a result, the outer lid is less stressed, and is less likely to deform.

Figure 5:
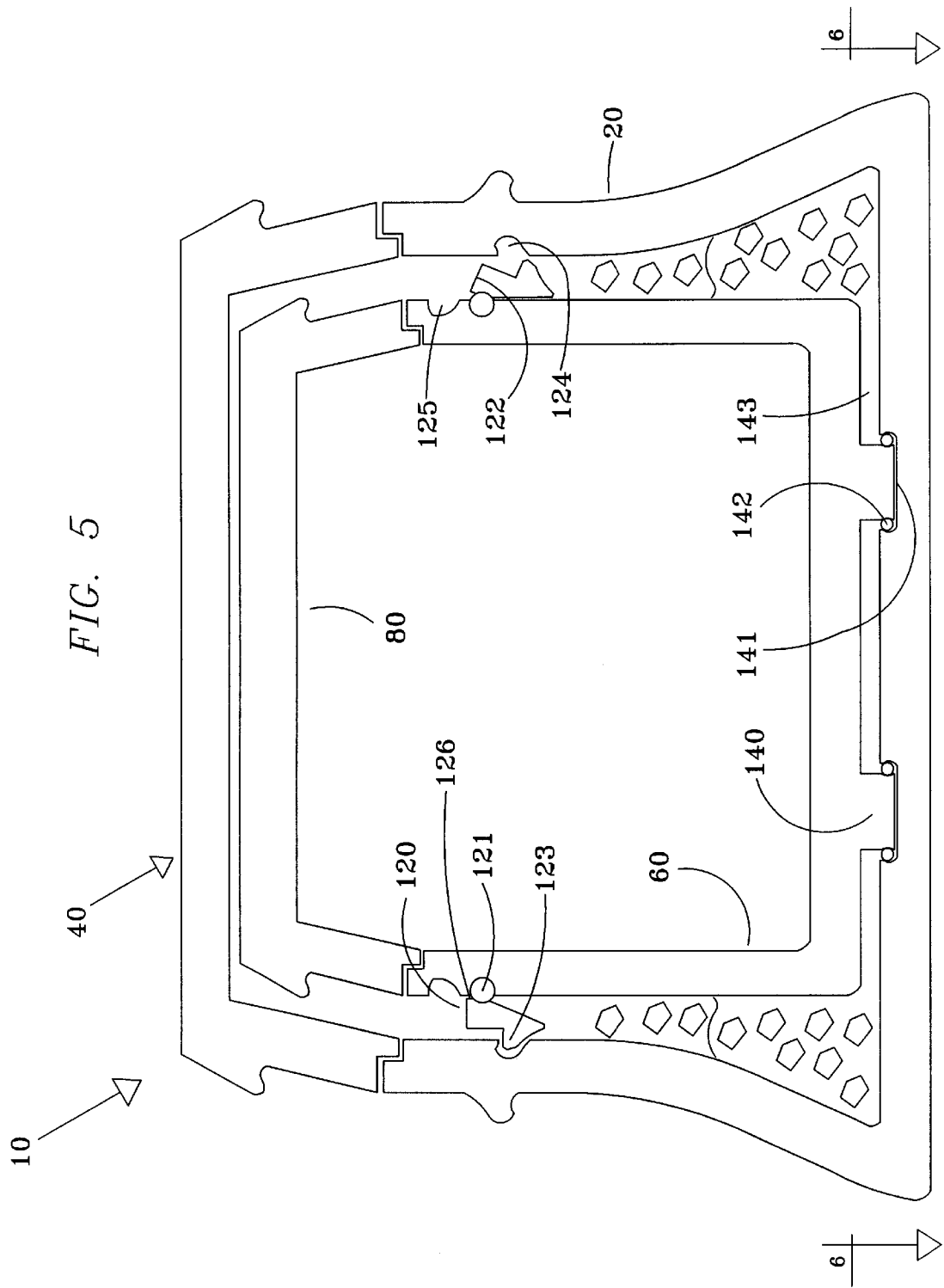
FIG. 5 is a cross sectional view of a second version of the portable cooler chest, differing from the first version in that anti-float arms and square support feet have been added.
Figure 6:
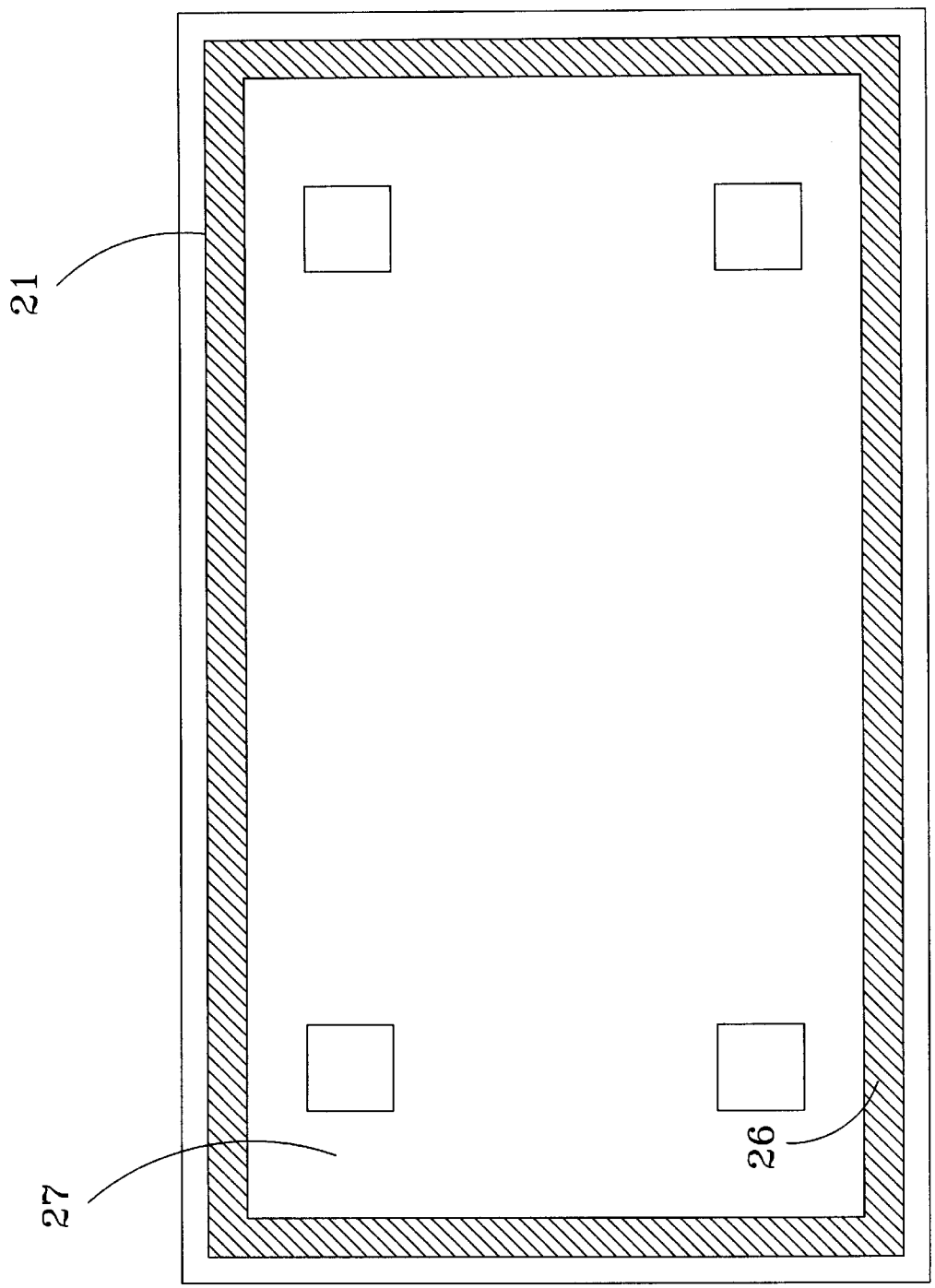
FIG. 6 is a cross-sectional view of the portable cooler chest of FIG. 5, taken along the 6—6 lines of FIG. 5.

As seen in FIGS. 5 and 6, a second version of the portable cooler chest 10 is seen. An outer container 20 supports an outer lid 40 in a manner similar to the portable cooler chest of FIGS. 1–4. The inner container 60 similarly supports an inner lid 80. The second version includes anti-float arms, which prevent the inner container from floating on melted ice within the outer container. The second version also provides support feet which allow ice water to circulate under the inner container, and which provide a frictional fit which also resists tends to prevent the inner container from floating.

An anti-float arm 120, carried by the outer sidewall surface 61 of the inner container 60 prevents the inner container from floating if the ice melts and the buoyancy due to the resulting water exceeds the weight of the contents of the inner container. The anti-float arm 120 rotates on a spring pivot 121 between a locked position and an unlocked position. The locked position is seen on the left side of FIG. 5, while the unlocked position is seen on the right side. The structure of the spring pivot would typically include a spring wrapped about a hinge, but could include other known hardware as appropriate.

In the locked position seen on the left side of FIG. 5, the spring pivot has biased the locking tooth 123 into a position within the locking gap 124 defined in the inside surface of the outer cooler.

In the unlocked position seen on the right side of FIG. 5, the spring pivot has been moved by a user hand (not illustrated for clarity) to remove the locking tooth from the locking gap. The user's finger tips press on the top surface 122, causing the spring to tighten and the anti-float arm to rotate. Once rotated, the user may slide one or more fingers into the finger slot 125 defined in the outside surface of the inner container. Using the finger slot, the inside container is easily lifted from within the outside container. Alternatively, by using sufficient force to overcome the spring pivots, the user may simply grab the inner cooler by locking fingers within the finger slots 125 and pull. This will force the spring pivots to rotate, moving the locking tooth out of the locking gap.

When the inside container is removed from the outside container, the anti-float arm will pivot until the stop surface 126 contacts the outside surface of the inside container.

To position the inside container within the outside container, the locking arms are forced slightly against their biasing spring pivots and the inner container is inserted into the outer container. The locking tooth of each anti-float arm will snap into place when the inner container is lowered to the point that the locking tooth is adjacent to the locking gap.

Continuing to refer to FIGS. 5 and 6, four support feet 140 are carried by the bottom surface of the inner container. The support feet allow water to circulate through a passage 143, and to thereby remove heat from the base 66 of the inner container. The feet snap into associated sockets 141 defined in the top surface of the base 27 of the outer container. If desired an O-ring 142 may be carried by each foot, to result in additional friction between the foot 140 and the socket 141. The additional friction tends to assist in the prevention of the flotation of the inner container within the outer container when sufficient ice melts.

In use, the inner container is filled with food requiring storage at reduced temperature, and the inner lid placed on the inner container. The inner container is then put inside the outer container in a manner that results in insertion of a portion of the base 66 into the recessed region 28 of the base 27 of the outer container 20.

Ice is then added to the region 102 between the containers. Due to the flared ice entry passage 100 defined between the sloping sidewall 83 of the inner lid 80 and the curved inner sidewall surface 22 of the outer container 20, the ice is easily added. The outer lid is then attached to the outer container.

During use, the ice tends to melt as heat is transferred from the inner container and from outside the outer container into the ice storage area 102. As a result, a mixture of ice and ice water tends to accumulate in an ice water area 104 below the ice. Some of the ice water moves through the cold water passages 106 formed by the ice water troughs 31 defined in the base 27 of the outer container 20. Heat from the inner container is therefore transferred through the base 66 and into the cold water in the passages 106.

The previously described versions of the present invention have many advantages, including a primary advantage of providing a novel cooler chest with ice-surrounding food compartment that separates ice and food, each with separate compartments.

Another advantage of the present invention is to provide a cooler chest with ice-surrounding food compartment wherein the outer container has a curved sidewall, particularly wherein an upper rim of the curved sidewall flairs outwardly, thereby allowing the more convenient loading of ice into an ice storage area defined between the inner and outer containers.

A still further advantage of the present invention is to provide a cooler chest with ice-surrounding food compartment, wherein the base of the outer container defines a recessed region, whereby a portion of the base of the inner container may be located within the recessed region thereby holding the inner container in place, and optionally the base of the outer container may define ice water troughs, whereby water melted from the ice may circulate in contact with the base of the inner container.

Although the present invention has been described in considerable detail and with reference to certain preferred versions, other versions are possible. For example, while a preferred shape for the inner and outer containers has been described, resulting in the preferred handles and sealing rim, alternative configurations could be substituted having some of the same advantages. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A cooler chest comprising:
   (A) an outer container comprising:
      (a) a base, formed of an insulating layer defining a recessed region;
      (b) sidewalls, extending from a perimeter of the base, formed of curved outer and inner surfaces between which is carried an insulation layer;
      (c) a handle surface, defined on the curved outer surface; and
      (d) a perimeter rim of an upper portion of the sidewalls defining a notch;
   (B) an outer lid, carried by the outer container, comprising:
      (a) a flat top formed of an insulating material;

(b) sloping sidewalls, carried by a perimeter of the flat top, formed of an insulating material;
(c) a perimeter rim and tongue, defined on the sloping sidewalls, sized to seal with the perimeter rim and notch of the outer container; and
(d) a handle surface, defined on the sloping sidewalls;

(C) an inner container, carried within the outer container, comprising:
(a) a base, sized for partial insertion into the recessed region;
(b) sidewalls, extending from a perimeter of the base;
(c) a handle surface, defined on the sidewalls; and
(d) a perimeter rim of a upper portion of the sidewalls defining a notch; and (D) an inner lid
(a) a flat top;
(b) sloping sidewalls, carried by a perimeter of the flat top;
(c) a perimeter rim and tongue, defined on the sloping sidewalls, sized to seal with the perimeter rim and notch of the inner container; and
(d) a handle surface, defined on the sloping sidewalls.

2. A cooler chest comprising:
(A) an outer container comprising:
(a) a base, formed of an insulating layer defining a recessed region;
(b) sidewalls, extending from a perimeter of the base, formed of curved outer and inner surfaces between which is carried an insulation layer;
(c) a handle surface, defined on the curved outer surface;
(d) a perimeter rim of an upper portion of the sidewalls defining a notch; and
(e) at least one ice water trough, defined in the base, forming a cold water passage;

(B) an outer lid, carried by the outer container, comprising:
(a) a flat top formed of an insulating material;
(b) sloping sidewalls, carried by a perimeter of the flat top, formed of an insulating material;
(c) a perimeter rim and tongue, defined on the sloping sidewalls, sized to seal with the perimeter rim and notch of the outer container; and
(d) a handle surface, defined on the sloping sidewalls;

(C) an inner container, carried within the outer container, comprising:
(a) a base, sized for partial insertion into the recessed region;
(b) sidewalls, extending from a perimeter of the base;
(c) a handle surface, defined on the sidewalls; and
(d) a perimeter rim of a upper portion of the sidewalls defining a notch;

(D) an inner lid
(a) a flat top;
(b) sloping sidewalls, carried by a perimeter of the flat top;
(c) a perimeter rim and tongue, defined on the sloping sidewalls, sized to seal with the perimeter rim and notch of the inner container; and
(d) a handle surface, defined on the sloping sidewalls; and (E) an ice storage area, defined between the curved inner surface of the sidewalls of the outer container and an outer surface of the sidewall of the inner container.

3. A cooler chest comprising:
(A) an outer container having at least two sockets defined on an upper surface of a base;
(B) an outer lid, carried by a curved outer sidewall of the outer container;
(C) an inner container, carried within the outer container, comprising:
(a) a base, having a support foot carried by each of the at least two sockets, whereby the length of the support foot separates the inner container from the outer container to define a water passage between the base of the inner container and the base of the outer container;
(b) sidewalls, extending from a perimeter of the base; and
(c) at least two anti-float arms, carried by opposed sidewalls by a spring pivot, wherein each anti-float arm is movable between a locked position wherein a locking tooth portion of each anti-float arm engages a locking gap defined in the inside surface of the outer container, and an unlocked position wherein the locking tooth has been removed from the locking gap; and
(D) an inner lid, carried by the inner container.

4. The cooler chest of claim 3, additionally comprising:
(A) an O-ring, carried by each support foot, whereby insertion of the support foot into the associated socket compresses the O-ring, thereby resisting floating of the inner container within the outer container.

\* \* \* \* \*